Figure 9:
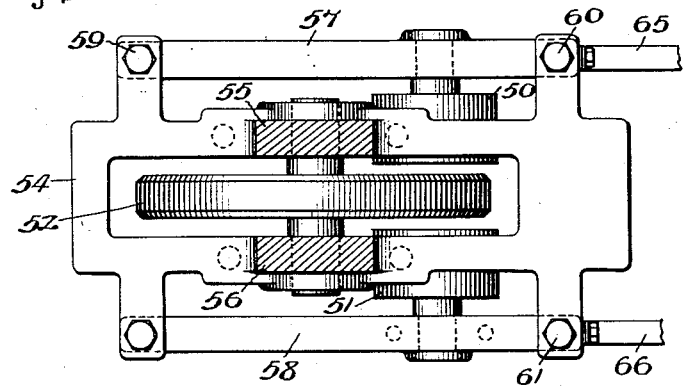

May 22, 1928.
J. M. WEED
1,670,699
ELECTRIC WELDING
Filed April 28, 1925    3 Sheets-Sheet 1
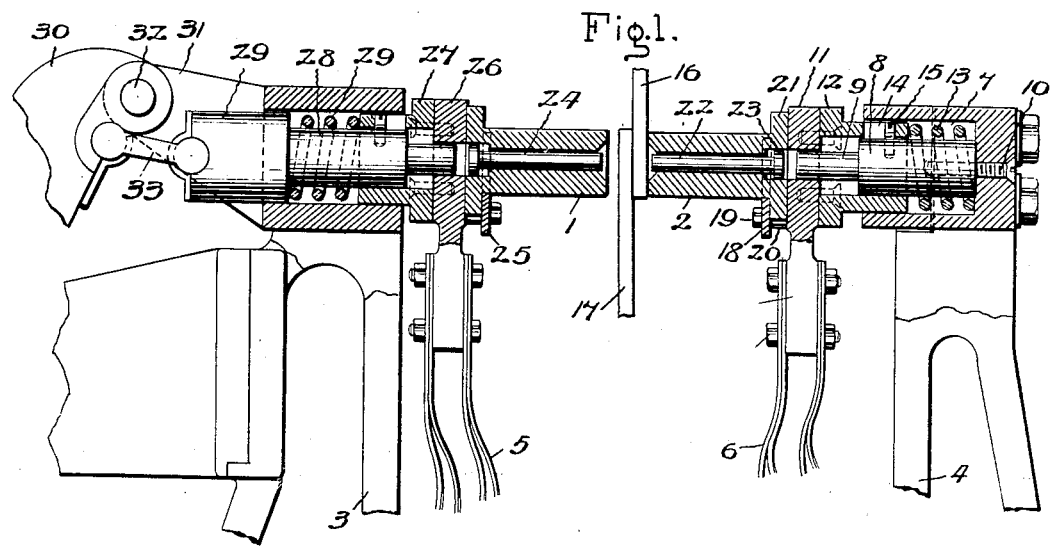
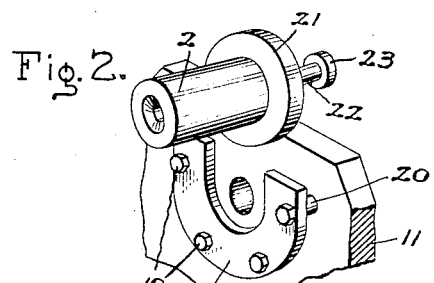
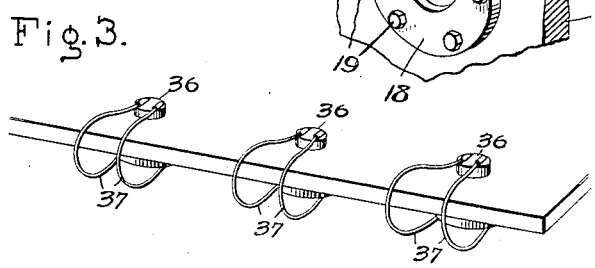
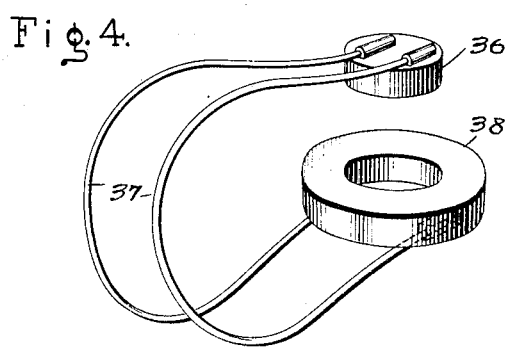
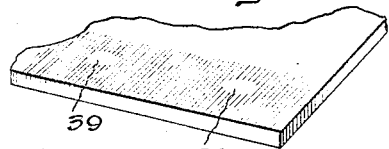
Inventor:
James M. Weed,
by *Alexander S. Lunt.*
His Attorney.

May 22, 1928.
J. M. WEED
ELECTRIC WELDING
Filed April 28, 1925
1,670,699
3 Sheets-Sheet 2
Fig.6.
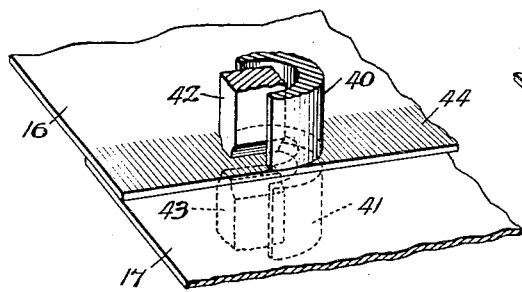
Fig.7.
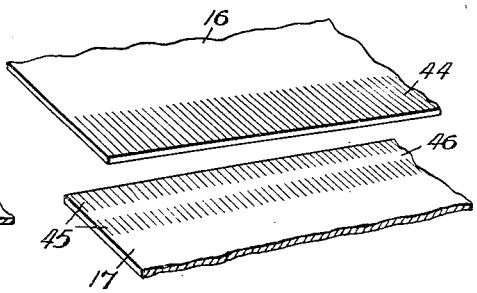
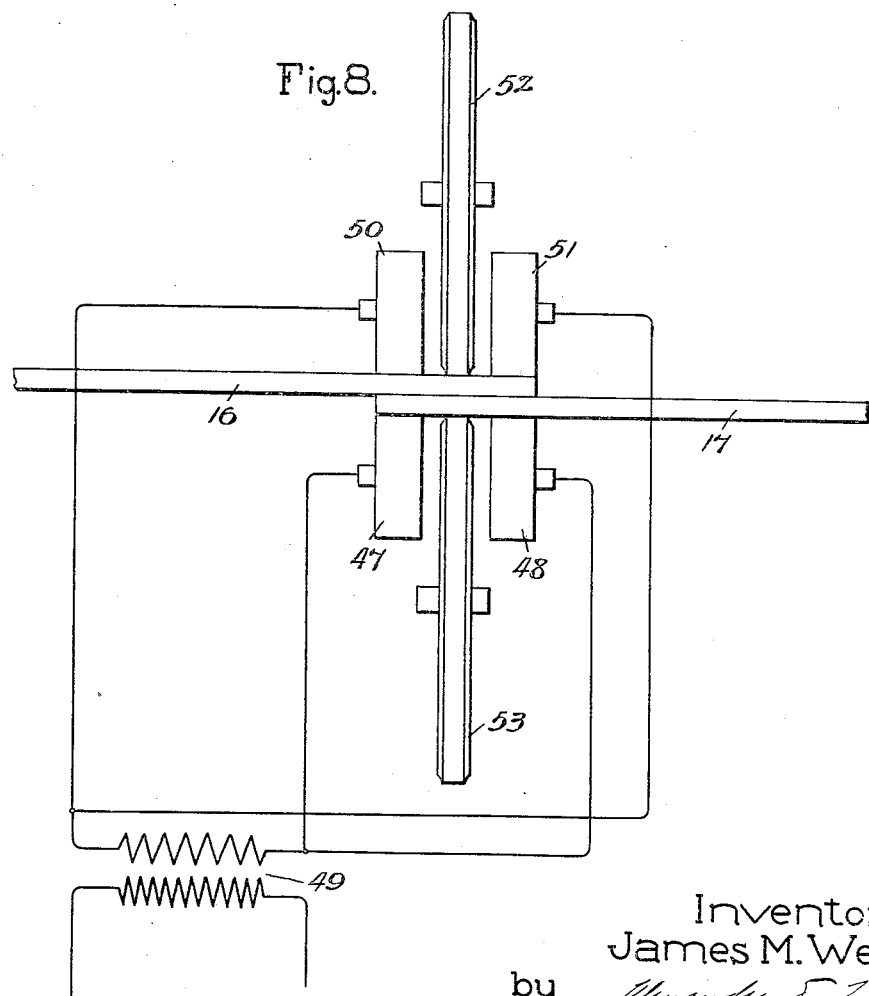
Fig.8.
Inventor:
James M. Weed,
by
His Attorney.

May 22, 1928.  
J. M. WEED  
ELECTRIC WELDING  
Filed April 28, 1925

1,670,699

3 Sheets-Sheet 3

Inventor:  
James M. Weed,  
by *Alexander S. Lunt*  
His Attorney.

Patented May 22, 1928.

1,670,699

UNITED STATES PATENT OFFICE.

JAMES M. WEED, OF SCOTIA, NEW YORK, ASSIGNOR TO GENERAL ELECTRIC COMPANY A CORPORATION OF NEW YORK.

ELECTRIC WELDING.

Application filed April 28, 1925. Serial No. 26,459.

My invention relates to electric welding, and has for its principal objects the provision of an improved method of welding and an improved apparatus through which this method may be utilized in the welding of heavy metal parts. My improved method of welding per se is described and claimed in my divisional application Serial No. 209,347 filed July 29, 1927.

In my Letters Patent of the United States, No. 1,449,206, March 20, 1923, I have disclosed a method of welding whereby a resistance coating interposed between the surfaces to be united is utilized to localize and intensify the heat of the weld at these surfaces and whereby heating of the electrodes through which current is transmitted to the metal of the weld is minimized by providing clean surfaces at the points of contact between the work and electrodes. As explained in the aforementioned Letters Patent, this method of welding may be utilized to advantage in the welding of heavy metal parts where pressures likely to produce deformation of the welding electrodes are required to produce intimate contact between the surfaces to be united and where heavy currents are required to heat the metal to a temperature suitable for welding. In accordance with my present invention, the efficiency of this method of welding is further increased by confining the welding current, in its passage through the contiguous surfaces of the members to be welded, to the surface areas which it is desired to unite, and by further reducing the contact resistance between the electrodes and the work, and deformation of the contact faces of the electrodes is avoided by this reduction of contact resistance, with the consequent reduction of heating of said faces, and by the use of auxiliary pressure members.

The welding current is confined to the desired surface areas by the provision of an insulating coating between the members to be welded except at the areas where the welds are desired. The contact resistance between the electrodes and the work is reduced by the application of a conductive coating to the work at the areas of contact between the work and the electrodes. The pressure of the electrodes upon the work is resiliently adjusted to that which is sufficient for the conduction of the welding current with minimum resistance, but not great enough to deform the contact surface, while the additional pressure required to bring the members to be welded into intimate contact to effect the welds is rigidly applied through auxiliary pressure members. Since these pressure members are not required to conduct the current, and therefore need not be highly conductive, a material such as high speed tool steel may be used which possesses high compressive strength and is not affected by the heat to which it is subjected.

My invention will be better understood from the following description when considered in connection with the accompanying drawings and its scope will be pointed out in the appended claims.

Figure 10:
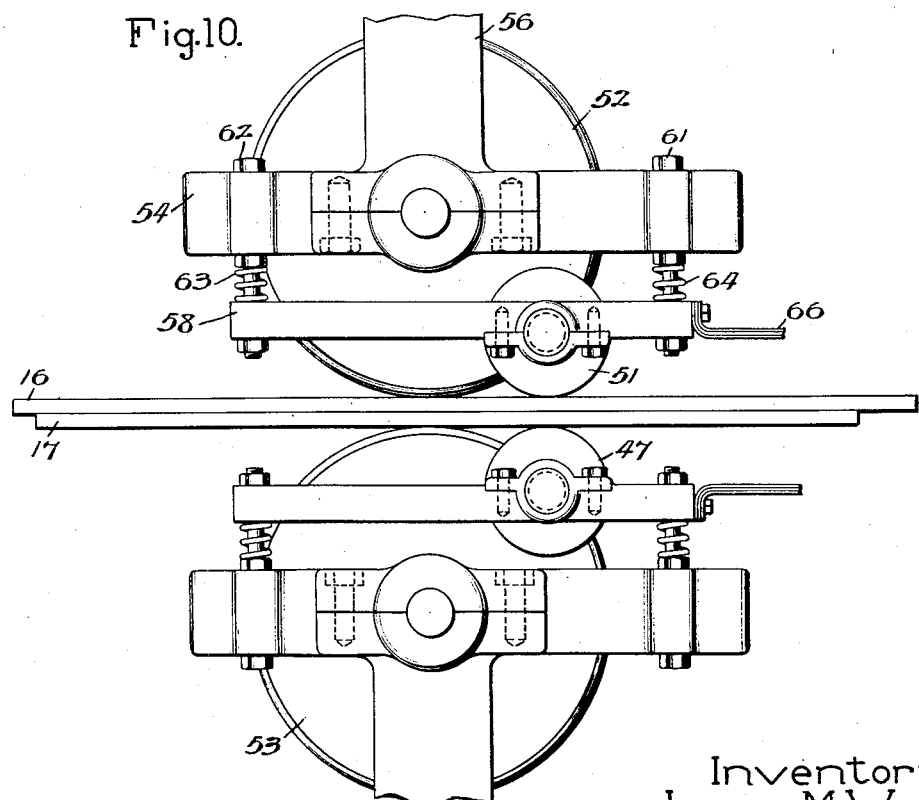

Referring to the drawings, Figs. 1 and 2 show various features of a spot welding machine whereby my invention has been embodied; Figs. 3, 4 and 5 illustrate one type of apparatus which may be utilized in the application of coatings to the parts to be united; Figs. 6, 7 and 8 diagrammatically illustrate ways of utilizing my invention in the production of line welds: and Figs. 9 and 10 show certain features of a line welding machine constructed to operate in accordance with my invention.

Fig. 1 shows a spot welding apparatus comprising hollow electrodes 1 and 2 which are supported by members 3 and 4 respectively and are arranged to be supplied with current from a suitable source through leads 5 and 6. At its free end, the support member 4 is provided with a cylindrical socket wherein a stationary cylindrical member 8 having a reduced end portion 9 is mounted by means of a screw 10 extending through the base of the socket. A terminal member 11 connected to the lead 6 is provided with an opening adapted to receive the end portion 9 of the member 8 and is attached to a hollow plunger 12 which is biased to its illustrated position by a spring 13, is provided with a slot 14 adapted to receive a screw 15 fixed to the member 8 for holding the said plunger against the spring 13. Said plunger is enlarged at its left hand end to form a collar adapted to carry the screws for attaching terminal member 11. As shown more clearly in Fig. 2, a U-shaped member 18 is attached to the terminal member 11 by means of bolts 19 and is spaced therefrom by collars 20 to permit ready removal and replacement of the electrode 2 which is provided at its right hand end with a flanged portion 21. A pressure member 22, made of high speed steel or other material having high compressive strength when subjected to a high temperature, is arranged to engage the left hand end of the member 8 and to be forced into contact with the surface of plate 16 when the member 12 is moved to the right. The member 22 is provided with a head 23 by which it is retained within the electrode 2.

A mechanism comprising electrode 1, pressure member 24, U-shaped member 25, terminal member 26, hollow plunger 27, cylindrical member 28 and spring 29 is supported at the free end of the member 3. The arrangement and operation of this mechanism will be readily understood in view of what has been said with respect to the mechanism supported at the end of the member 4. It will be observed that the cylindrical member 28 is provided at its left hand end with an enlarged portion 29 which is arranged to be moved to and fro through an opening in the end of the member 3 for the purpose of rigidly forcing the pressure members 22 and 24 into engagement with opposite sides of the work and for forcing the electrodes 1 and 2 into contact with opposite sides of the work through the resilient connections formed by the springs 29 and 13 respectively. Suitable means, shown as a member 30 hinged to the member 31 at 32 and coupled to the enlarged portion 29 through a member 33, are provided for forcing the member 28 to the right when it is desired to clamp the work between the jaws of the machine.

Assuming the various parts of the machine be in their illustrated positions, the work may be clamped between the jaws of the machine by operating the member 30 in a manner to move the member 28 into engagement with the pressure member 24 thus forcing this member into contact with the work and pressing the work against the pressure member 22 which is forced into engagement with the reduced end portion 9 of the member 8. Under these conditions, the work is rigidly clamped between the pressure members 22 and 24; the electrodes are held in contact with opposite sides of the work by pressures dependent on the resiliency of the springs 13 and 29; and a spot weld between the plates 16 and 17 may be produced by connecting the leads 5 and 6 with a suitable source of welding current.

In welding parts thin enough to be forced into intimate contact by the pressure members 22 and 24, it has been found that current is transmitted between the electrodes and work through areas determined by the contact surfaces of the electrodes; that current is transmitted between the parts to be welded through areas dependent on the contact surfaces of the pressure members; and that little difficulty is encountered in restricting the welding current to the areas to be united. In the case of thick parts, however, the pressure between the contiguous surfaces is more or less uniformly distributed over an area much larger than the contact surfaces between the work and pressure members, and, for this reason, the welding current is not restricted to the areas to be united. This dissipation of current and the consequent dissipation of heating effect over areas larger than those which it is desired to unite is, in fact, increased by the resistance coating described in Patent No. 1,449,206, although, as there stated, said resistance coating does tend to localize the heat at the surfaces between which the weld is to occur as distinguished from the masses of the bodies to be welded. In accordance with that part of the invention claimed in my divisional application above referred to, this difficulty is avoided by the provision of an insulating coating interposed between the contiguous surfaces of the work in a manner to restrict the welding current to the areas to be united. This insulating coating may consist of any suitable material such as whitewash or certain mineral paints comprising solvents which are readily volatilized, and may be applied to one of the work surfaces in a manner which will be readily understood upon consideration of Figs. 3, 4 and 5.

Fig. 4 shows a spring clip or shield device comprising a disk 36 for covering the spot to be welded while the insulating coat is being applied, a ring or washer 38 for marking the points at which the welding electrode is to be applied or for permitting the application of a conductive coating, such as metallic paint for example, at these points, and springs 37 for holding the disk and ring in contact with opposite sides of the work while the insulating coating is being applied to one side of the work and the location of the weld is being marked on the other side of the work. As indicated by Fig. 3, a number of shield devices may be placed along the edge of the work at points where it is desired to produce a spot weld, a strip of coating being applied along the edge of the work as indicated by the shaded area of Fig. 5. The spots which are protected from the coating by the disks 36 are indicated at 39. With the coating thus applied to one part of the work, the surfaces to be united are placed in contact with one another and spot welds are produced between their surfaces at the points 39. As previously indicated, this method of welding heavy parts has the great advantage that the heat for welding is not only localized and intensified at the surfaces to be welded together by reason of a high resistance coating at the spots 39, but the efficiency is further increased by reason of the fact that the insulation coating causes the welding current to pass only through these limited areas.

As diagrammatically indicated by Figs. 6 and 7, the method of welding described above may be utilized to produce a line weld between the sheets 16 and 17. In Fig. 6, the electrodes 40 and 41, which are presumed to be connected to the secondary terminals of a welding transformer, are shown as partly surrounding the pressure members 42 and 43, and the conductive coating applied to the surface of contact between the sheet 16 and electrode 40 is indicated at 44. It will of course be understood that a like conductive coating is applied to the surface of contact between the sheets 17 and the electrode 41. In Fig. 7, the insulating coating 45 is shown as applied along the edge of the sheet 17 in a manner to leave a strip of surface 46 along the line of the weld. This strip is preferably provided with a high resistance coating. The electrode and pressure members shown by Fig. 6, mounted in suitable supports, such as are described in connection with Fig. 1 are moved to the right in step by step manner, to produce a series of overlapping spot welds between the sheets 16 and 17. With the electrode arranged slightly in advance of the pressure member as indicated, the current is transmitted through the new areas to be welded rather than through the completed weld.

Fig. 8 is a diagrammatic showing of a disk electrode apparatus which may be utilized to produce a line weld between the sheets 16 and 17 in accordance with the method described above. This apparatus comprises disk electrodes 47 and 48 connected to one secondary terminal of a welding transformer 49, and like electrodes 50 and 51 connected to the other secondary terminal of the transformer 49. Pressure rolls 52 and 53 are provided for forcing the sheets 16 and 17 into intimate contact with one another along the line weld. As in the case of the apparatus indicated by Fig. 6 it is preferable that the electrodes slightly precede the pressure rolls along the line of the weld in order that the current may be transmitted through the work to be welded rather than through the completed weld.

As indicated by Figs. 9 and 10, the pressure roll 52 may be mounted in a member 54 supported in any suitable manner through the arms 55 and 56 which are shown as broken away at the top. The electrode 50 is provided at one of its sides with a shaft arranged to rotate in a bearing mounted on the member 57, and the electrode 51 is provided with a like shaft arranged to rotate in a bearing mounted on the member 58, the members 57 and 58 being connected to the member 54 through a resilient connection formed by bolts 59, 60, 61 and 62 and spring members which surround these rolls as shown at 63 and 64. The electrodes 47 and 48 and pressure roll 53, which engage the opposite side of the work from that engaged by electrodes 50 and 51 and pressure roll 52, are mounted in a welding head similar to that just described. In producing a line between the plates 16 and 17 with this form of apparatus, relative movement between the welding heads and the work is produced in a manner to cause the electrodes to be moved along the line of the weld, preferably slightly in advance of the pressure rolls. Thus, in Figure 10, the motion of the welding heads would be toward the right.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. An electric welding machine comprising a pair of support members spaced apart to receive the work to be welded, a plurality of electrodes each connected to a different one of said members through a connection comprising resilient means, a plurality of movable pressure members each associated with a different one of said electrodes, and means mounted on one of said members for rigidly clamping the work between said pressure members and for resiliently clamping the work between said electrodes.

2. An electric spot welding machine comprising a pair of support members spaced apart to receive the work to be welded, a plurality of hollow electrodes each connected to a different one of said members through a resilient connection, a plurality of pressure members each arranged to extend through a different one of said electrodes, and means mounted on one of said members for rigidly clamping the work between said pressure members and for resiliently clamping the work between said electrodes.

3. An electric spot welding apparatus comprising a pair of support members spaced apart to receive the work to be welded, a plurality of plunger members each movably mounted at the end of a different one of said members and connected thereto through a connection comprising resilient means, a plurality of hollow electrodes each secured to a different one of said plunger members, a plurality of pressure members arranged to form a rigid connection between said support members and each arranged to extend within a different one of said electrodes, and means interposed in the connection between one of the electrodes and one of said support members for rigidly clamping the work between said pressure members and resiliently clamping the work between said electrodes.

4. An electric welding machine comprising a pair of support members spaced apart to receive the work to be welded, a plurality of electrodes each connected to a different one of said members through a connection comprising resilient means, a plurality of movable pressure members each made of a material having high compressive strength when subjected to a high temperature and each associated with a different one of said electrodes, and means mounted on one of said members for rigidly clamping the work between said pressure members and for resiliently clamping the work between said electrodes.

5. An electric welding machine comprising a pair of support members spaced apart to receive the work to be welded, a plurality of electrodes each connected to a different one of said members through a connection comprising resilient means, a plurality of movable pressure members each made of a material having the characteristics of high speed steel and associated with a different one of said electrodes, and means mounted on one of said support members for rigidly clamping the work between said pressure members and for resiliently clamping the work between said electrodes.

In witness whereof, I have hereunto set my hand this 25th day of April, 1925.

JAMES M. WEED.